United States Patent [19]

Ekkelboom et al.

[11] Patent Number: 5,159,239
[45] Date of Patent: Oct. 27, 1992

[54] ELECTRIC LAMP WITH SIO2 VESSEL AND SEAL THEREFOR

[75] Inventors: Tjepke H. Ekkelboom; Karel M. Van Der Waarde, both of Eindhoven, Netherlands

[73] Assignee: U.S. Philips Corporation, New York, N.Y.

[21] Appl. No.: 758,323

[22] Filed: Aug. 27, 1991

Related U.S. Application Data

[63] Continuation of Ser. No. 619,808, Nov. 27, 1990, abandoned, which is a continuation of Ser. No. 313,659, Feb. 21, 1989, abandoned, which is a continuation-in-part of Ser. No. 208,958, Jun. 17, 1988, abandoned.

[30] Foreign Application Priority Data

Feb. 23, 1988 [NL] Netherlands .......................... 8800447
Jan. 12, 1989 [NL] Netherlands .......................... 8900066

[51] Int. Cl.$^5$ ............................................. H01J 61/36
[52] U.S. Cl. .................................. 313/623; 313/318; 313/331; 313/332; 313/634
[58] Field of Search ............... 313/623, 332, 331, 318, 313/634; 174/50.61, 50.58

[56] References Cited

U.S. PATENT DOCUMENTS

| | | | |
|---|---|---|---|
| 2,114,869 | 4/1938 | Bol et al. .......................... | 174/50.61 |
| 2,617,068 | 11/1952 | Spinnler et al. ................. | 313/623 X |
| 2,675,497 | 4/1954 | Meister et al. ................... | 313/332 X |
| 3,448,320 | 6/1969 | Millikan ........................... | 313/331 X |
| 3,742,283 | 6/1973 | Loughridge ...................... | 174/50.61 X |
| 4,074,167 | 2/1978 | van den Broek et al. ........ | 313/331 X |
| 4,086,075 | 4/1978 | Ekkelboom et al. . | |
| 4,171,500 | 10/1979 | van Lieshout .................... | 313/633 X |
| 4,282,395 | 8/1981 | Hagemann ........................ | 313/623 X |
| 4,691,142 | 9/1987 | Dohmen ............................ | 313/623 |

FOREIGN PATENT DOCUMENTS

952939 3/1964 United Kingdom ................ 313/579

Primary Examiner—Palmer C. DeMeo
Attorney, Agent, or Firm—Brian J. Wieghaus

[57] ABSTRACT

The electric lamp has a quartz glass lamp vessel having tungsten current supply conductors extending through the wall of the lamp vessel to an electric element arranged in the lamp vessel. The current supply conductors have a continuous coating of quartz glass where they extend through the envelope wall from the interior to the exterior of the lamp vessel. The coating forms with the current supply conductor a glass/metal interface forming a gas-tight seal. The glass of the coating adjoining the interface contains thorium, hafnium, chromium, aluminum, titanium, tantalum, magnesium, calcium, strontium, barium, zirconium, lanthanum, scandium, lanthanides, niobium, boron and yttrium. The coating has a very strong adhesion to the metal and; the lamp vessel at the gas-tight seal has a great strength.

26 Claims, 1 Drawing Sheet

ELECTRIC LAMP WITH SIO$_2$ VESSEL AND SEAL THEREFOR

This is a continuation of application Ser. No. 619,808, filed Nov. 27, 1990, now abandoned, which is a continuation of Ser. No. 313,659, filed Feb. 21, 1989, now abandoned, which is a continuation-in-part of application Ser. No. 208,958 filed Jun. 17, 1988, now abandoned.

BACKGROUND OF THE INVENTION

The invention relates to an electric lamp comprising:
a lamp vessel sealed in a vacuum-tight manner and consisting of glass having an SiO$_2$ content of at least 95% by weight:
an electric component arranged within the lamp vessel,
current supply conductors extending through the wall of the lamp vessel to the electric component,
at least one current supply conductor mainly consisting of tungsten and having a continuous coating of glass having an SiO$_2$ content of at least 95% by weight, which coating extends from the exterior to the interior of the lamp vessel and forms with the current supply conductor a glass/metal interface, while
the surface of the coating encloses with the coated surface of the current supply conductor at the points at which they meet an angle $\alpha$ of at most 90°.

Such a lamp is known from U.S. Pat. No. 4,171,500.

In this known lamp, stringent requirements are imposed on the thickness of the coating. This thickness d must be so small that it corresponds to the formula $D(d+2d)^{-1} > 0.7$, where D is the diameter of the current supply conductor. The thickness of the coating is therefore allowed to be only at most 21% of the diameter of the current supply conductor. Especially in case this conductor must be thin, for example 0.7 or even 0.2 mm, therefore only an extremely small thickness of the coating is admissible (at most 0.14 mm and 0.04 mm, respectively). In the preferred case mentioned in the said Patent Specification, in which $D(D+2d)^{-1} \geq 0.85$, i.e. $d \leq 0.09 D$, even a thickness only 0.06 and 0.02 mm, respectively, is then admissible. This forms a serious drawback for the manufacture of the known lamp in mass production. It should be noted that the range of 0.2 to 0.7 mm is very usual for a thickness of internal current supply conductors welded to a metal foil embedded in the wall of the lamp vessel.

In the known lamp according to the aforementioned U.S. Pat. No. 4,171,500, the coating must moreover be enclosed between its ends by a thick envelope, a thick second coating, of similar glass. The necessity of this envelope forms due to the additional fusion step necessarily ensuing therefrom a further limitation for the industrial application of the known lamp.

The wall of the lamp vessel is fused in the known lamp with the said envelope, but in such a manner that the envelope has both inside and outside the lamp vessel a surface extending parallel to the surface of the current supply conductor. This results in that the current supply conductor is sealed into glass over a comparatively great length. An associated consequence is that in the lamp vessel around the current supply conductor there is a comparatively large space, which—due to its comparatively low temperature during operation of the lamp—can influence the light production of the lamp.

In substantially all types of electric lamps comprising a lamp vessel of glass hving an SiO$_2$ content of at least 95% by weight, the current supply conductors are passed in a vacuum-tight manner through the wall of the lamp vessel in that the current supply conductors include a foil-shaped part of molybdenum, which is embedded in a pinched seal of the lamp vessel. In this construction, the foil-shaped part must be connected to the conductor extending into the interior of the lamp vessel and to the conductor extending from the pinched seal to the exterior, for which purpose welding connections must be established. Due to the ohmic resistance of the foil-shaped part, not only electric losses, but also a harmful development of heat occur in the pinched seal. The current supply conductor is moreover a slack assembly, which can be manipulated only with difficulty during the manufacture of the lamp and which makes it difficult to position accurately in the lamp vessel the part that becomes located within said lamp vessel. The accuracy of positioning could be improved if the current supply conductor with a foil-shaped part could also be held and continuously be positioned within the lamp vessel during the manufacture of a first pinched seal of the lamp vessel. During the manufacture of a second seal, a rigid current supply conductor would then have to be used. Another disadvantage of lamps having a pinched seal is that the seal is destroyed at a comparatively low gas pressure of about 80 bar. In spite of these disadvantagesm pinched seals are generally used in lamps commercially available. Excepted are only short arc discharge lamps.

In short arc discharge lamps, a construction is used, in which the current supply conductor is sealed into glass having a comparatively high expansion coefficient, which is connected via glasses having decrementally decreasing expansion coefficients to the glass of the lamp vessel, which has a very low expansion coefficient. This so-called "graded seal" obtained with the use of so-called "transition glasses" is expensive and can mostly be realized only manually. Moreover, the construction occupies a large amount of space.

GB 2,064,216-A discloses an electric lamp, in which the current supply conductors have a continuous coating of a transition glass having an expansion coefficient in the range of $11-17 \times 10^{-7} K^{-1}$. These glasses contain besides about 81-87% by weight of SiO$_2$ also a comparatively large quantity of B$_2$O$_3$ and Al$_2$O$_3$. Since these glasses have a comparatively low softening temperature, it must be avoided by forming an embossed part on the surface of the pinched seal in which the coated current supply conductors are included that the coating of comparatively low viscosity is removed during the manufacture of the pinched seal from the conductor by the quartz glass of the lamp vessel of comparatively high viscosity. Consequently, the known lamp necessarily has a profiled seal, which may be disadvantageous when mounting the lamp vessel in a lamp cap. Moreover, the comparatively low SiO$_2$ content of the transition glass may involve the risk of giving way to attack by the gas filling of the lamp. The maximum permissible temperature of the glass, moreover, is only about 700° C.

The construction having a foil-shaped part and the construction having a graded seal are used because glasses having an SiO$_2$ content of at least 95% by weight, such as, for example, quartz glass and "Vycor", i.e. a glass containing 96% by weight of SiO$_2$, have a linear expansion coefficient which is considerably smaller (in the range of about $4 \times 10^{-7} K^{-1}$ to about $12 \times 10^{-7} K^{-1}$) than that of tungsten (about $45 \times 10^{-7} K^{-1}$). This great difference in expansion coefficient and the great difference between the softening temperature of the glasses and the operating temperature of the lamps on the one hand and room temperature on the other hand result in that tungsten cannot be included in a vacuum-tight manner in these glasses without special steps being taken.

For several decades attempts have been made to obtain special measures by which tungsten could be sealed into glasses, such as quartz glass. The result of the examinations is that commercially available lamps in such glasses still have either a pinched seal with an embedded metal foil or a graded seal.

The construction according to the aforementioned U.S. Pat. No. 4,171,500 is not used either. In spite of the mechanical strength the construction according to this Patent Specification can have the disadvantages mentioned with respect to this construction are apparently too serious. It has further been found that it is difficult to manufacture the construction described in a reproducible manner. It has been found that the reproducibility is associated with the extent to which a coating of, for example, quartz glass on the current supply conductors, which adheres to the conductors, can be obtained in a reproducible manner.

U.S. Pat. No. 3,448,320 discloses an electric incandescent lamp having a tungsten current supply conductor of at most 0.1 mm thickness, which is directly sealed into the wall of a quartz glass lamp vessel. It is emphasized that no layer of impurities must be present on the tungsten conductor. The tungsten conductor is brought into a non-oxidized state and is degased by heating at 175° to 2200° C. in nitrogen or rare gas. However, the lamp described is not commercially available. The maximum thickness of the conductor is further too small for practical applications.

U.S. Pat. No. 4,086,075 discloses a method of providing a vitreous coating on metal wires. The method consists in that a metal wire together with a glass tube rightly fitting around it is heated in the high-frequency field in a protective gas, such as nitrogen. The high-frequency field can be produced by a coil connected to a current source. A non-shortcircuited coil is present in the high-frequency field, which coil is heated, like the metal wire, by the high-frequency field. They both heat the glass tube to this melting point. The coated wire is free of oxides; impurities have not been able to accumulate between the wire and the coating. By this method, according to the said Patent Specification, also vitreous coatings can be provided on wires of thoriated tungsten, which was not possible with prior methods because thorium oxide diffused to the surface of the wire and prevented a gas-tight adhesion of the glass to the wire. If a thoriated tungsten wire acting as electrode was necessary, a butt weld had to be formed thereon between the thoriated tungsten wire and a tungsten wire free of thorium oxide and the latter wire had to be provided with a glass coating.

The adhesion of a vitreous coating to a tungsten conductor apparently requires that the coating is provided on a tungsten conductor which is free at its surface of absorbed gases and of oxides and other impurities.

SUMMARY OF THE INVENTION

The invention has for its object to provide an electric lamp of the kind mentioned in the opening paragraph, which has a very simple construction that can be manufactured readily in a reproducible manner and nevertheless has a great strength.

According to the invention, this object is achieved in that the glass of the coating adjoining the glass/metal interface contains an element from the group consisting of thorium, hafnium, chromium, aluminum, titanium, tantalum, magnesium, calcium, strontium, barium, zirconium, lanthanum, scandium, lanthanides, niobium, boron and yttrium.

It has been found that the presence of at least one or the said elements in that layer of the glass coating that adjoins the glass/metal interface is a condition for obtaining a strong adhesion of the coating to the metallic surface of the current supply conductor. The presence of such an element in the coating can be demonstrated in a Scanning Electron Microscope (SEM) by means of Energy Dispersive Analysis by X-rays (EDAX), by Auger Electron Spectroscopy (AES) or by Wavelength Dispersive Analysis of X-rays (WDX).

The strength of the adhesion of the coating to the current supply conductor appears inter alia from the following observations, in which thorium was present in the glass adjoining the glass/metal interface.

Midway between the ends of a quartz glass coating of 10 mm length and 0.275 thickness on a tungsten current supply conductor having a diameter of 0.55 mm, a spherical thickened part of quartz glass was provided by fusion of a quartz glass ring. The thickened part had a diameter of 3 mm. By immersion of the assembly from an environment of room temperature at once in liquid nitrogen, the curren supply conductor broke into two pieces inside the coating at the area of the thickened part without the fragments of the conductor losing their anchorage in the coating. It held for the thickness d of the coating and the diameter D of the conductor that: $d = 0.5 D$.

A tungsten current supply conductor having a diameter of 0.55 mm had a quartz glass coating having a thickness of 0.275 mm ($d = 0.5 D$). The conductor was heated by direct current passage in nitrogen at 800° C., whereupon the wire was allowed to cool. After ten switching operations, the coating was still fully in tact. The coating had a length of 10 mm. The coating, surrounded by air, was heated at its center by a plasma burner so strongly that the quartz glass evaporated substantially completely at that area. The coating was then still fully intact on both sides of the heated area.

A 220 V 1000 W floodlight lamp having tungsten current supply conductors of 0.55 mm diameter each having a quartz glass coating of 0.275 mm thickness was operated while switching: 30 δ ON, 150 s OFF (D=0.5 D). After 2000 switching operations, the lamp was still fully intact.

A 50 W high-pressure mercury discharge lamp having tungsten current supply conductors of 0.55 mm diameter each having a quartz glass coating of 0.275 mm thickness (d=0.5 D) was operated for 10,000 h. after which the lamp still was fully in tact.

It has already been stated that lamps comprising a lamp vessel of glass having an $SiO_2$ content of at least 95% by weight, sealed with a pinched seal in which a metal foil is accommodated, have a crack pressure of approximately 80 bar. The lamp vessel of the said 50 W high-pressure mercury discharge lamp was checked with respect to its resistance to pressure. A pressure of 180 bar was then built up in the lamp vessel at room temperature without the lamp vessel being destroyed. Higher pressures could not be used because 180 bar is the upper limit of the measuring range of the relevant testing apparatus.

The high resistance to pressure of the lamp according to the invention, in which the current supply conductors mainly consist of tungsten and have a respective said glass coating, is of major importance. Thus, it is possible, while maintaining the safety, to provide a high operating pressure for the lamp. For a lamp in which the light source is a filament this means that the filament can have a higher operating temperature, while maintaining its lifetime, and thus can have a higher luminance and a higher efficiency. Due to the high operating pressure, the evaporation of the material of the filament is in fact suppressed.

The lamp according to the invention can be obtained in a simple manner. At least one coated current supply conductor is then sealed into a lamp vessel of, for example, quartz glass. The coating on the current supply conductor may be obtained, for example, by applying a dispersion of at least one material chosen from thorium, hafnium, chromium, aluminum, titanium, tantalum, magnesium, calcium, strontium, barium, zirconium, lanthanum, scandium, lanthanides, niobium, boron and yttrium. Alteratively, a compound of one of these elements, such as an oxide, a salt, such as, for example, a nitrate, chloride, acetyl acetonate, may be applied to the tungsten wire. The wire is heated above the melting point of the glass, for example, to about 2200° C., and fused to a glass which is arranged to surround the wire. The wire may be fused to the glass in a protective gas, such as, for example, nitrogen or a rare gas or in a vacuum. The said elements diffuse during fusion into the coating.

It is also possible to start from a conductor of tungsten containing a said element as such or as oxide as an addition, for example a conductor of tungsten containing 1 or 3% by weight of $ThO_2$ or $Y_2O_3$. In this case, the element or oxide can be brought to the surface of a conductor by oxidizing the conductor at elevated temperature, for example at 600° C. or higher, for example at about 1200° C., for example by exposing it to air at elevated temperature, and by then heating it in a protective gas, such as a rare gas or nitrogen, or in vacuo to a temperature above 1400° C., for example to about 1600° C. Tungsten oxide then evaporates and the element is left in oxidic form at the surface. The conductor is then provided with a coating of, for example, quartz glass, for example by heating the conductor enveloped by a quartz glass tube in a high-frequency field. This method of applying has already been described above when mentioning U.S. Pat. No. 4,086,075. Instead of a nonshortcircuited helix, however, a ring may be used in the high-frequency field.

In case in this manufacturing method a coating must be provided on a comparatively thin conductor having, for example, a diameter of 0.2 mm, it is recommendable to use a glass tube having a small wall thickness of, for example, 0.1 mm. With the use of a tube having a comparatively large wall thickness, the inner side of this tube would not be heated to a sufficiently high temperature by the comparatively thin conductor by means of irradiation. It may then be recommendable to supply also heat to the conductor by direct current passage or by means of a laser. Alternatively, first in a high-frequency field a thin coating may be provided in an environment of rare gas or nitrogen that can readily be maintained with the use of this heat source, as the case may be in a slightly reducing environment by the addition of a few to a few tenths of % by volume of hydrogen, or in vacuo, and then a thickened portion may locally be formed by means of a burner on this coating. For this purpose, a glass tube can be slipped around the coating and said tube is fused with the coating, for example, by heating by means of a flame. A comparatively thick coating or a local thickening of the coating may be of importance for readily processing the coated conductor to a portion of a lamp.

It is a surprise to find that it is of minor importance for the stability and the quality of the lamp whether the coating of the conductor is thin. It has been found that comparatively very thick coatings also adhere excellently to the conductor and have only very small mechanical stresses. Further it has been found that coatings on comparatively very thick conductors are of high quality and very stable.

A tungsten current supply conductor having a diameter D of 0.55 mm had a coating of quartz glass having a thickness d of 0.775 mm with thorium in the glass adjoining the glass/metal interface. The ratio d/D therefore was 1.4. This coating was capable of withstanding without damage 3000 switching operations in nitrogen, the conductor being heated by current passage to 600° C. and then being cooled; 20 s current passage, 40 s no current passage. The same result was obtained with a conductor having a diameter of 1 mm and a coating of 1.5 mm thickness (d/D=1.5). A conductor having a diameter of 1 mm and a quartz glass coating of 0.375 mm thickness was heated in the same cycle 10,000 times to 700° C., the transient current amounting to 75 A. Thorium was present in the quartz glass. The coated conductor was capable of withstanding the test without any damage.

The angle $\alpha$ between the surface of the glass coating and the coated surface of the current supply conductor at the point at which they meet is at most 90°, but is generally smaller in the lamp according to the invention. It appears therefrom that the glass suitably wets the metal. The material that was present on the surface of the current supply conductor during the manufacture of the lamp influences the wetting of the conductor by the glass and, as already demonstrated, the adhesion of the glass to the conductor, not in an unfavourable, but in a favourable sense.

The electric component of the lamp according to the invention may be a pair of electrodes, as the case may be surrounded by an inner envelope. The pair of electrodes may be constituted by the inner free ends of the current supply conductors. The inner free ends may have, for example, a thickened part or a wrapped portion or an electrode head may be fixed thereto. The electric component may alternatively be a filament, for example a filament in a halogen-containing gas mixture.

The current supply conductors generally have a thickness in the range of 0.2 to 0.7 mm, but smaller thicknesses of example with 0.17 mm, for example with discharge lamps of low power about 35 W, or larger thicknesses, for example 2 mm, for short arc discharge lamps may be used. In general, current supply conductors will have a thickness in the range of 0.4 to 0.7 mm.

The construction of the lamp according to the invention with coated tungsten current supply conductors is of particular importance for small discharge lamps because of the possibility of accurately positioning the electrodes due to the fact that the current supply conductors are rigid as compared with current supply conductors with a foil-shaped part.

The construction with coated tungsten current supply conductors is also of particular importance for small incandescent lamps, in which the lamp vessel has a very small diameter and the lamp vessel must be capable of withstanding a high filling pressure and hence a very high operating pressure, and in which the filament is centered comparatively accurately in the narrow lamp vessel.

Such an incandescent lamp has a tubular lamp vessel having an inner diameter in tha range of about 2 to about 6 mm, and a gas filling having a pressure at room temperature in the range of 8 to 60 bar, the gas filling mainly consisting of a gas chosen from xenon, krypton and xenon/krypton mixtures containing as the case may be $2.10^{-8}$–$12.10^{-7}$ mol of Hal/cm$^3$, where Hal is chosen from Br, Cl and Br/Cl mixtures. The filament has during operation at nominal voltage a color temperature of at least 3300 K.

Due to the comparatively high pressure in the lamp and to the comparatively narrow lamp vessel, the filament can be operated at a comparatively high color temperature, while the lamp nevertheless has a comparatively long life. The incandescent lamp is particularly suitable for use in optical systems.

Current supply conductors having a diameter of 0.55 mm were provided by each of the following methods with a coating of glass having an SiO$_2$ content of at least 95% by weight in order to render them suitable for sealing into a lamp vessel consisting of such a glass. Very satisfactorily adhering coatings were then obtained, which satisfy stringent requirements.

A wire of tungsten containing 3% by weight of ThO$_2$ uniformly distributed therein was heated at 1200° C. and exposed to air. The tungsten oxide then formed was subsequently evaporated at about 1600° C. in an inert environment. After a tungsten peal had been removed in this manner, ThO$_2$ originally present therein was left at the surface. A tube of quartz glass having a length of 15 mm and a wall thickness of 0.275 mm was fused with the wire. Thorium was found by means of EDAX in the glass adjoining the glass/metal interface. Moreover, the presence of thorium was demonstrated at the surface of the coating near the end thereof.

A wire of tungsten doped with 0.01% by weight of K, Al, Si in all, i.e. a usual dopant to control the crystal growth in the wire, was immersed in a suspension of 10 mg of HfO$_2$ in 0.5 ml of water. The wire was provided in a corresponding manner with a coating of quartz glass. Near the glass/metal interface, the presence of hafnium was demonstrated in the glass by means of EDAX.

By the use of a suspension of 10 mg of an oxide of yttrium, chromium, aluminum, titanium, tantalum, magnesium, calcium, strontium, barium, zirconium, lanthanum, scandium, niobium, boron, a lanthanide as e.g. cerium, gadolinium, neodymium, in 0.5 ml of water or butyl acetate in the case of a hydroscopic oxide, a quartz glass coating was obtained in an analogous manner on such a tungsten wire, in which the metal of the oxide in question was demonstrated.

BRIEF DESCRIPTION OF THE DRAWINGS

An embodiment of the lamp according to the invention is shown in the drawing.

In the drawing.

DESCRIPTION OF THE PREFERRED EMBODIMENTS

Figure 1:
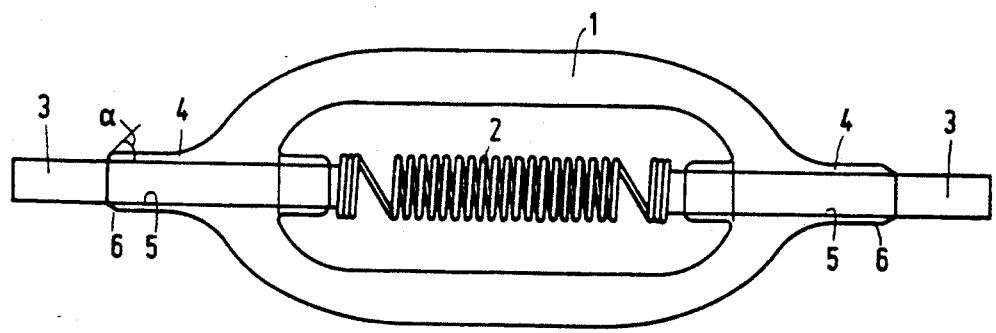
FIG. 1 is a side elevation on a strongly enlarged scale of an incandescent lamp with a diagrammatically indicated filament.

In FIG. 1, the electric incandescent lamp has a lamp vessel 1 sealed in a vacuum-tight manner and consisting of glass having an SiO$_2$ content of at least 95% by weight. A tungsten filament 2 is arranged in the lamp vessel 1 as an electric element. Current supply conductors 3 mainly consisting of tungsten extend opposite to each other through the wall of the lamp vessel 1 to the filament 2. A respective circumferential coating 4 of glass having an SiO$_2$ content of at least 95% by weight is disposed on the current supply conductors 3. The coating 4 extends from the exterior of the lamp vessel 1 to the interior of the lamp vessel. The coating 4 forms with the current supply conductor a glass/metal interface 5. The surface 6 of the coating 4 and the coated surface of the current supply conductors 3, i.e. the glass/metal interface 5, enclose at the area at which they meet an angle $\alpha$ of at most 90°. The glass of the coating 4 adjoining the glass/metal interface contains an element chosen from the group consisting of thorium, hafnium, chromium, aluminum, titanium, tantalum, magnesium, calcium, strontium, barium, zirconium, lanthanum, scandium, lanthanides, niobium, boron and yttrium.

In the lamp shown, the lamp vessel 1 and the coatings 4 consisted of quartz glass.

The current supply conductors 3 consisted of tungsten containing 3% by weight of thorium oxide and had a diameter of 0.55 mm. They were provided with a coating 4 having a thickness of 0.275 mm. The glass of the coating 4 adjoining the glass/metal interface contained thorium. The current supply conductors 3 were screwed into end turns of the filament 2, which had an outer diameter of 1 mm. The lamp vessel 1 had an inner diameter of 3 mm and was filled with 55 bar xenon, to which 7 mbar CH$_2$Br$_2$ was added, i.e. $2.24 \times 10^{-7}$ mol of Br/cm$^3$. Upon heating at 800° C. in a furance, the gas pressure increased to about 200 bar, which corresponds to the operating pressure of the lamp. The lamp consumed at 12.1 V a power of 55.6 W and had a colour temperature of 3360 K. The lamp may be used, for example, in headlight lanterns of motor vehicles.

In another embodiment tungsten current supply conductors of 0.65 mm diameter were used which had been immersed in a suspension of 10 mg of Cr$_2$O$_3$ in 10 ml of water and, after drying, had been provided with a quartz glass coating of 0.1 mm thickness. The glass of the said coating which adjoined the glass-metal interface contained chromium.

Figure 2:
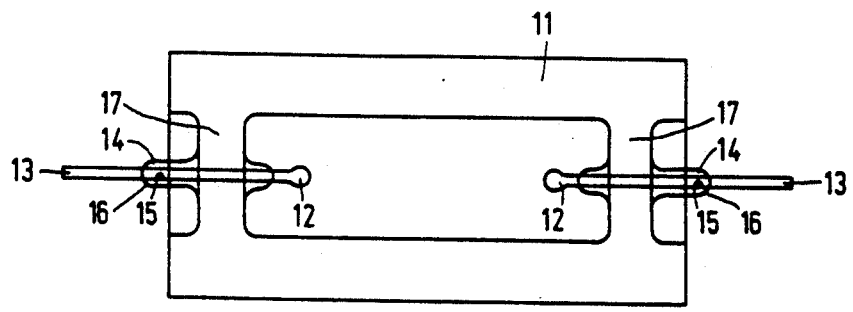
FIG. 2 is a side elevation of a discharge lamp.

In FIG. 2, parts corresponding to parts of FIG. 1 had a reference numeral which is 10 higher.

The current supply conductors 13 consist of tungsten containing 1% by weight of thorium oxide and have a diameter of 0.25 mm with a fused tip 12 in the lamp vessel 11. The fused tips 12 constitute as a pair of electrodes an electric element. Thorium is present in the quartz glass coatings 14. The coatings 14 have a thickness of 0.125 mm. A quartz glass ring 17 is provided thereon and fused thereto. The lamp vessel 11 has an inner length of 7.8 mm and an inner diameter of 2.7 mm. The lamp vessel 11 is filled with 6 bar xenon (at 300 K), 0.6 mg of mercury and 0.4 mg of an NaI/ScI$_3$/TlI/-

ThI$_4$ mixture. The lamp consumes at a voltage of 85 V a power of 35 W and may be used, for example, as a light source in a headlight lantern of a motor vehicle.

Figure 3:
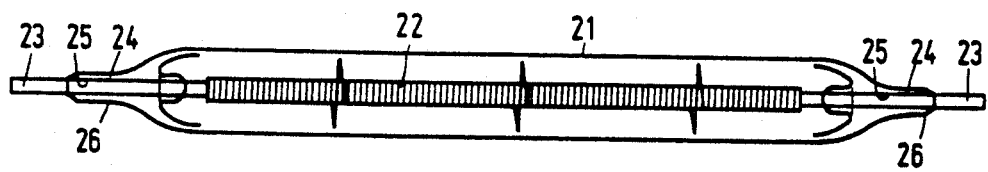
FIG. 3 is a side elevation of an incandescent lamp with a diagrammatically indicated filament.

In FIG. 3, parts corresponding to parts of FIG. 1 have a reference numeral which is 20 higher. The lamp is a 225 V 1000 floodlight lamp having a colour temperature of 3100 K. The current supply conductors are made of tungsten containing 3% by weight of Y$_2$O$_3$ and have a thickness of 0.8 mm. They are coated with quartz glass having a thickness of 0.5 mm. Yttrium is present in the quartz glass coating in the glass adjoining the glass/metal interface 25. The quartz glass lamp vessel 21 is filled with 2.5 bar argon containing 0.3% by volume of Ch$_2$Br$_2$.

Figure 4:
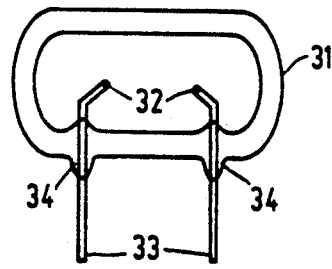
FIG. 4 is a side elevation of a discharge lamp.

FIG. 4 shows an example of a lamp in which the current supply conductors extend beside each other through the wall of the lamp vessel. The lamp has a tubular quartz glass lamp vessel 31, which is spherically sealed at its both ends. Current supply conductors 33 each have a quartz glass coating 34 fused with the lamp vessel 31. They carry a respective electrode 32. The lamp vessel 31 is provided with an ionizable filling. Hafnium is present in the quartz glass coatings 34.

The current supply conductors consist of tungsten which in all contains 0.01% by weight of K, Al and Si. The conductors have diameters of 0.25 mm and have a quartz glass coating of 0.125 mm. Hf was present in the glass of the coating adjoining the glass-metal interface, since the conductors, before they were provided with the coatings, had been immersed in a suspension of HfO$_2$ in water.

We claim:

1. An electric lamp, comprising:
   a lamp vessel sealed in a vacuum-tight manner and consisting of glass having an SiO$_2$ content of at least 95% by weight,
   an electric component arranged within the lamp vessel,
   current supply conductors extending through the wall of the lamp vessel to the electric component,
   at least one of said current supply conductors consisting mainly of tungsten and having a continuous coating of glass having a SiO$_2$ content of at least 95% by weight, said glass coating extending from the exterior to the interior of the lamp vessel and forming with the current supply conductor a glass/metal interface,
   the surface of the glass coating enclosing with the coated surface of the current supply conductor at the points at which they meet an angle of at most 90°, characterized in that: the glass of the coating adjoining the glass/metal interface contains an element chosen from the group consisting of thorium, hafnium, chromium, aluminum, titanium, tantalum, magnesium, calcium, strontium, barium, zirconium, lanthanum, scandium, lanthanides, niobium, boron and yttrium.

2. An electric lamp as claimed in claim 1, characterized in that the chosen element is uniformly distributed in the current supply conductor.

3. An electric lamp as claimed in claim 2, characterized in that the chosen element is yttrium.

4. An electric lamp as claimed in claim 1, characterized in that the current supply conductor is essentially free of the chosen element.

5. An electric lamp as claimed in claim 4, characterized in that the chosen element is yttrium.

6. An electric lamp as claimed in claim 4, characterized in that the chosen element is hafnium.

7. An electric lamp as claimed in claim 4, characterized in that the chosen element is chromium.

8. An electric lamp as claimed in claim 7, characterized in that the current supply conductors each mainly consist of tungsten and have a respective glass coating.

9. An electric lamp as claimed in claim 8, characterized in that the electric element is a filament.

10. An electric lamp as claimed in claim 9, characterized in that the lamp vessel has in inner diameter in the range of 2 to 6 mm and a filling pressure in the range of 8 to 60 bar.

11. An electric lamp as claimed in claim 6, characterized in that the current supply conductors each mainly consist of tungsten and have a respective glass coating.

12. An electric lamp as claimed in claim 5, characterized in that the current supply conductors each mainly consist of tungsten and have a respective glass coating.

13. An electric lamp as claimed in claim 4, characterized in that the current supply conductors each mainly consist of tungsten and have a respective glass coating.

14. An electric lamp as claimed in claim 3, characterized in that the current supply conductors each mainly consist of tungsten and have a respective glass coating.

15. An electric lamp as claimed in claim 2, characterized in that the current supply conductors each mainly consist of tungsten and have a respective glass coating.

16. An electric lamp as claimed in claim 1, characterized in that the current supply conductors each mainly consist of tungsten and have a respective glass coating.

17. An electric lamp, comprising:
    a lamp vessel consisting of glass having an SiO$_2$ content of at least 95% by weight and having a wall enclosing an interior space of said lamp vessel;
    an electric component arranged within said lamp vessel; and
    a pair of current-supply conductors consisting essentially of tungsten extending from the exterior of the lamp vessel through said glass wall and connected to said electric component;
    said glass wall circumferentially contacting each conductor between the exterior and the interior of the lamp vessel in a gas-tight manner and defining a glass/metal interface with said conductors, and
    said glass of said wall circumferentially adjoining said current-supply conductors contains, only locally at said glass/metal interface, an element chosen from the group consisting of thorium, hafnium, chromium, aluminium, titanium, tantatulam, magnesium, calcium, strontium, barium, zirconium, lanthanum, scandium, lathanides, niobium, boron, and yttrium;
    said lamp vessel including said wall otherwise being free of said chosen element.

18. An electric lamp as claimed in claim 17, wherein said glass enclosing with the surface of the current-supply conductor at the points at which they meet an angle of at most 90°.

19. An electric lamp as claimed in claim 18, wherein said chosen element is uniformly distributed in said current-supply conductors.

20. An electric lamp as claimed in claim 19, characterized in that the chosen element is yttrium.

21. An electric lamp as claimed in claim 18, characterized in that the current supply conductor is essentially free of the chosen element.

22. An electric lamp as claimed in claim 21, characterized in that the chosen element is yttrium.

23. An electric lamp as claimed in claim 21, characterized in that the chosen element is hafnium.

24. An electric lamp as claimed in claim 21, characterized in that the chosen element is chromium.

25. An electic lamp as claimed in claim 18, characterized in that the electric component is a filament.

26. An electric lamp as claimed in claim 25, characterized in that the lamp vessel has an inner diameter in the range of 2 to 6 mm and a filling pressure in the range of 8 to 60 bar.

* * * * *